(12) United States Patent
Guthrie

(10) Patent No.: US 7,603,818 B2
(45) Date of Patent: Oct. 20, 2009

(54) GROUND ANCHOR

(76) Inventor: L. Lynn Guthrie, 16536 McElroy Rd., Whitehouse, TX (US) 75791

( * ) Notice: Subject to any disclaimer, the term of this patent is extended or adjusted under 35 U.S.C. 154(b) by 352 days.

(21) Appl. No.: 11/435,801

(22) Filed: May 17, 2006

(65) Prior Publication Data

US 2006/0265973 A1    Nov. 30, 2006

Related U.S. Application Data

(60) Provisional application No. 60/685,695, filed on May 25, 2005.

(51) Int. Cl.
 *E02D 5/74* (2006.01)
(52) U.S. Cl. .............................. 52/159; 52/155; 52/149; 52/158
(58) Field of Classification Search ........... 52/153–166, 52/148, 149
See application file for complete search history.

(56) References Cited

U.S. PATENT DOCUMENTS

| | | | | | |
|---|---|---|---|---|---|
| 1,316,323 | A | * | 9/1919 | Poole | 52/155 |
| 2,941,636 | A | * | 6/1960 | Cordes | 52/164 |
| 3,159,248 | A | * | 12/1964 | Biehn | 52/165 |
| 3,216,159 | A | * | 11/1965 | Rooker | 52/158 |
| 3,425,174 | A | * | 2/1969 | Wood | 52/162 |
| 3,927,494 | A | * | 12/1975 | Struben | 52/23 |
| 3,961,451 | A | * | 6/1976 | McCain | 52/163 |
| 4,026,080 | A | * | 5/1977 | Meikle | 52/159 |
| 4,363,198 | A | | 12/1982 | Meyer | 52/155 |
| 4,568,036 | A | | 2/1986 | Kearney | 242/95 |
| 4,778,126 | A | | 10/1988 | Spann, Jr. | 242/95 |
| 4,825,604 | A | * | 5/1989 | Manning | 52/158 |
| 4,831,952 | A | * | 5/1989 | Dulhunty | 114/309 |
| 5,437,128 | A | * | 8/1995 | Gremillion | 52/162 |
| 5,850,715 | A | * | 12/1998 | Francis | 52/155 |
| 6,564,515 | B1 | * | 5/2003 | Fontenot et al. | 52/155 |
| 2005/0108977 | A1 | | 5/2005 | Desjardins | |
| 2005/0150184 | A1 | | 7/2005 | Lagercranz | |
| 2005/0161652 | A1 | | 7/2005 | Morgan | |
| 2005/0212315 | A1 | | 9/2005 | Jean | |

\* cited by examiner

*Primary Examiner*—Richard E Chilcot, Jr.
*Assistant Examiner*—Alp Akbasli
(74) *Attorney, Agent, or Firm*—John M. Harrison

(57) ABSTRACT

A ground anchor which is suitable for anchoring a winch in the extrication of an ATV or other vehicle from mud or other loose soil is disclosed. An illustrative embodiment of the ground anchor includes a generally elongated anchor stake, a stake slot provided in the anchor stake, an elongated stabilizing arm pivotally attached to the anchor stake and extendable from the stake slot and an attachment arm pivotally attached to the stabilizing arm and slidably engaging the stake slot.

12 Claims, 2 Drawing Sheets

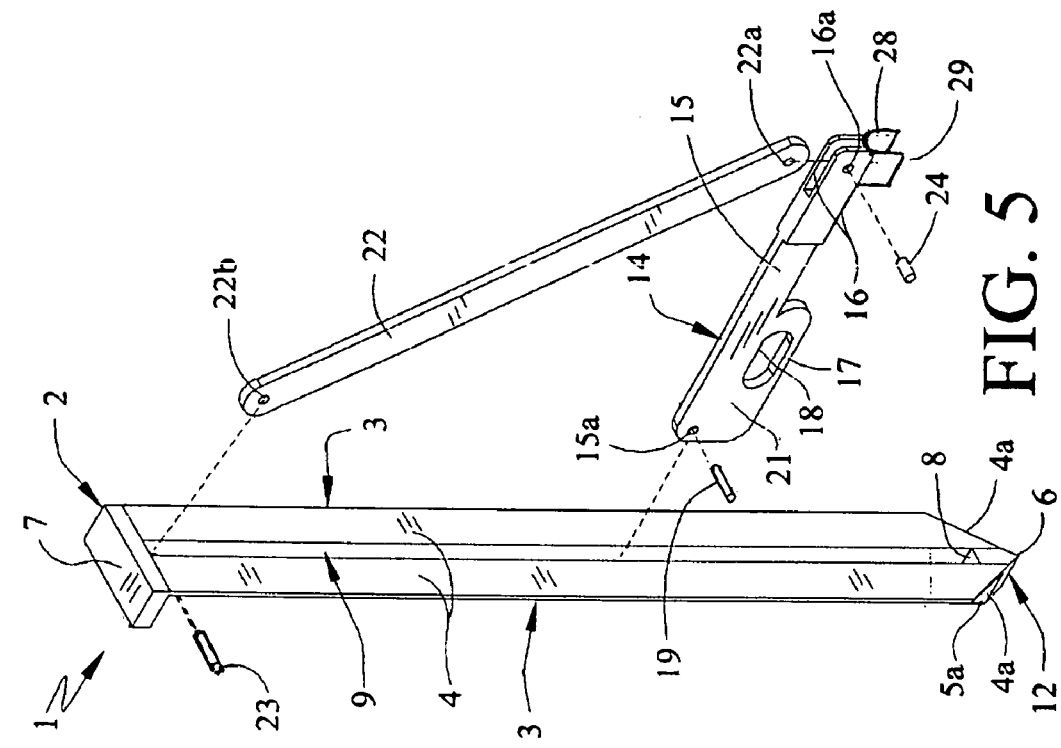
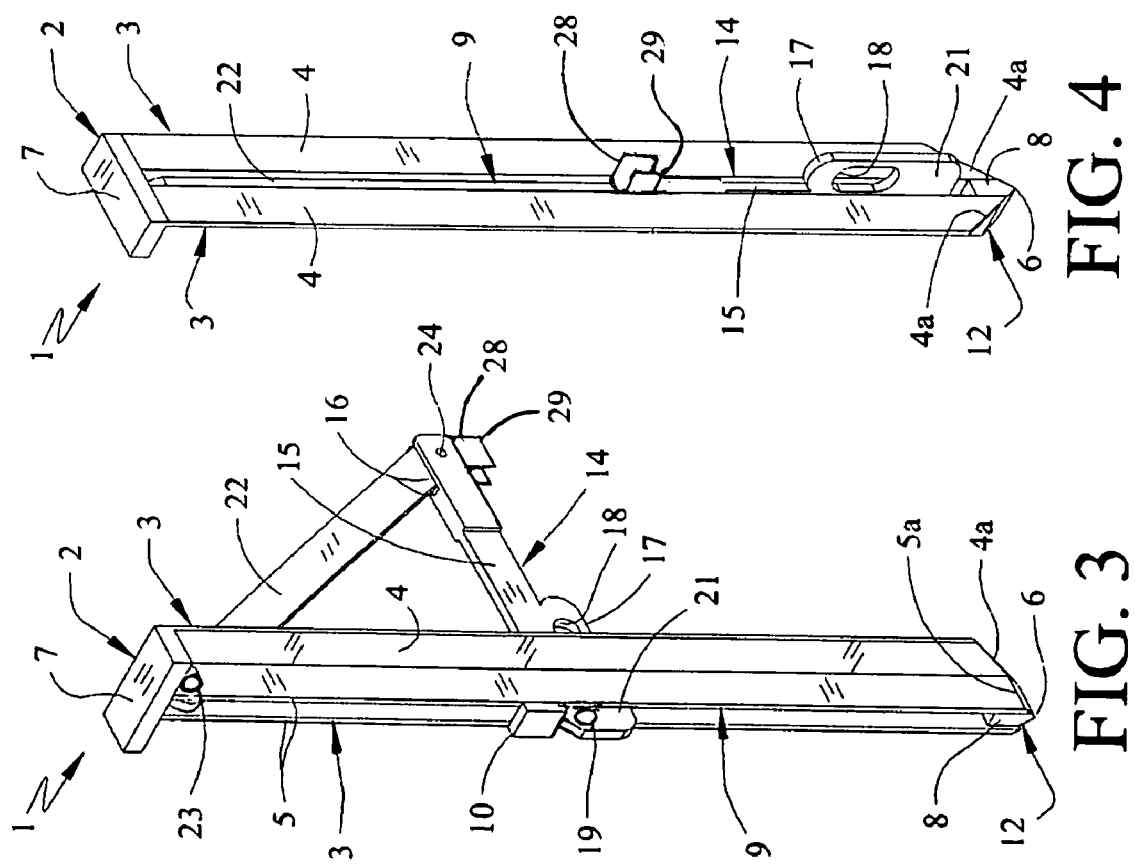

GROUND ANCHOR

CROSS-REFERENCE TO RELATED APPLICATIONS

This application claims the benefit of and incorporates by reference in its entirety U.S. provisional application No. 60/685,695, filed May 25, 2005.

FIELD

The present invention relates to anchors which are suitably adapted to serve as a winch support for dislodging or extricating vehicles immobilized in mud or other loose soil. More particularly, the present invention relates to a ground anchor which can be inserted in the ground to anchor a winch and winch cable for extricating an all-terrain vehicle (ATV) or other vehicle immobilized in mud or the like.

BACKGROUND

All-terrain vehicles (ATVs) are commonly used by outdoor enthusiasts as well as police, fire, wildlife and forestry personnel to traverse various types of terrain. Typical all-terrain vehicles include a frame having engine-driven wheels which are typically four or six in number. One or multiple racks may be provided on the frame to facilitate the carrying of various types of equipment such as hunting or camping equipment, for example, on the ATV.

Because of the types of terrain they are commonly used to traverse, ATVs may occasionally become inadvertently immobilized in mud or other loose soil, sometimes in remote locations which are not readily accessible by trucks and other large vehicles that could otherwise be used to dislodge an ATV. Therefore, the frame of an ATV may be fitted with a winch to facilitate extrication of the immobilized ATV from mud or other soil. In the event that immobilization of the ATV occurs in a wooded area, a winch cable of the winch can be extended from a rotating winch drum provided on a winch frame or bracket which is typically bolted to the ATV frame. The winch cable is typically fastened around a tree, which serves as an anchor as the winch is operated to rotate the winch drum and pull the ATV from the mud or other soil while the winch cable is wound on the winch drum. In the event that immobilization of the ATV occurs in a field or other open area which is completely or largely devoid of trees, a suitable anchor or support to which the winch cable can be attached may not be located within reach of the winch cable.

SUMMARY

The present invention is generally directed to a ground anchor which is suitable for anchoring a winch in the extrication of an ATV or other vehicle from mud or other loose soil. An illustrative embodiment of the ground anchor includes a generally elongated anchor stake, a stake slot provided in the anchor stake, an elongated stabilizing arm pivotally attached to the anchor stake and extendable from the stake slot and an attachment arm pivotally attached to the stabilizing arm and slidably engaging the stake slot.

BRIEF DESCRIPTION OF THE DRAWINGS

The invention will now be described, by way of example, with reference to the accompanying drawings, in which:

FIG. 3 is a rear perspective view of the ground anchor, deployed in an extended, functional configuration;

FIG. 4 is a front perspective view of the ground anchor, deployed in a folded, storage or non-functional configuration; and FIG. 5 is an exploded, perspective view of the ground anchor.

DETAILED DESCRIPTION

Figure 1:
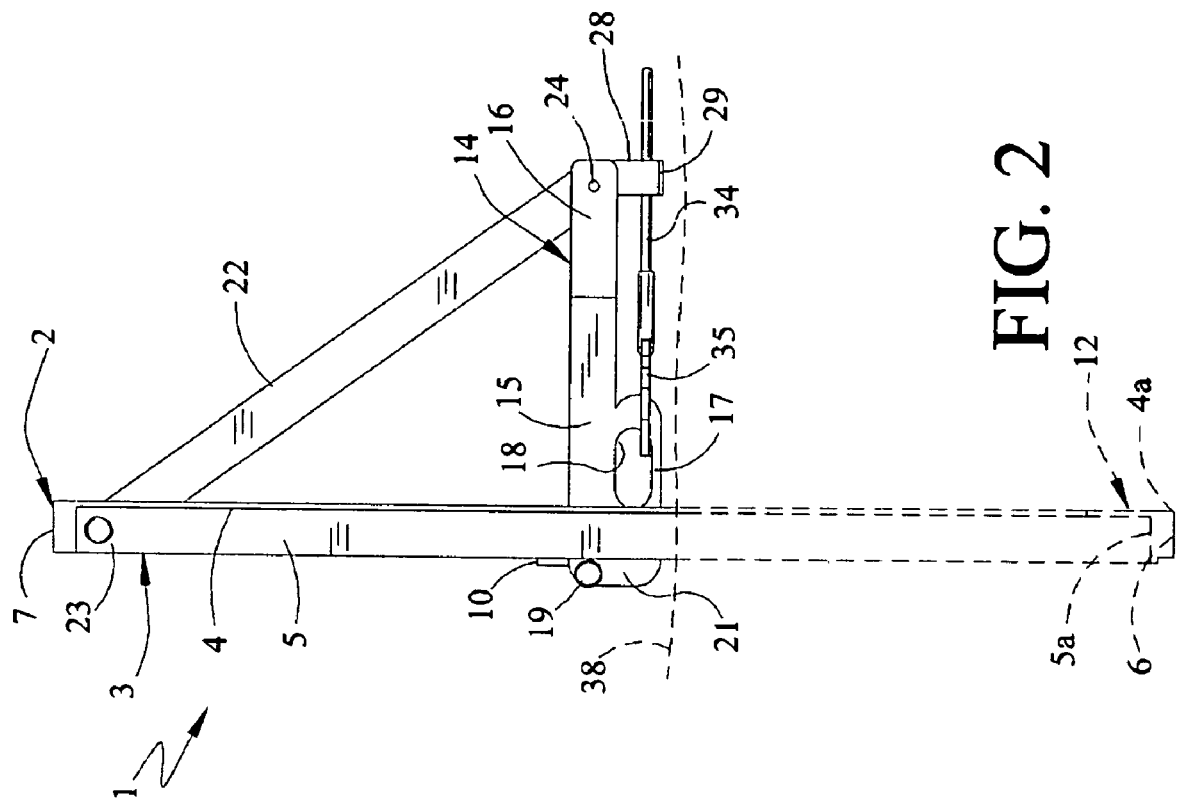
FIG. 1 is a front perspective view of an illustrative embodiment of the ground anchor of the present invention, inserted in the ground (shown in section) and deployed in an extended, functional configuration, with a winch cable (partially in section) attached to the ground anchor.

Referring to the drawings, an illustrative embodiment of the ground anchor according to the present invention is generally indicated by reference numeral 1. The ground anchor 1 has structurally rigid components such as steel, for example, and includes an elongated anchor stake 2 having a generally tapered insertion end 12. An elongated stake slot 9, the purpose of which will be hereinafter described, extends through the anchor stake 2, in generally parallel relationship to the longitudinal axis of the anchor stake 2. In some embodiments, the anchor stake 2 may include a pair of generally elongated, parallel, spaced-apart stake segments 3 which are welded and/or otherwise attached to each other, typically at the respective ends of the anchor stake 2. For example, a strike plate 7, the purpose of which will be hereinafter described, may be welded and/or otherwise attached to the end of the anchor stake 2 which is opposite the insertion end 12. A stake weld 8 may be provided between the stake segments 3 at the insertion end 12. The stake slot 9 extends between the spaced-apart stake segments 3 and is closed by the strike plate 7 at one end and the stake weld 8 at the insertion end 12 of the anchor stake 2. In other embodiments (not illustrated), the anchor stake 2 may have a singular or unitary plate construction, in which case the stake slot 9 extends through the plate.

Figure 2:
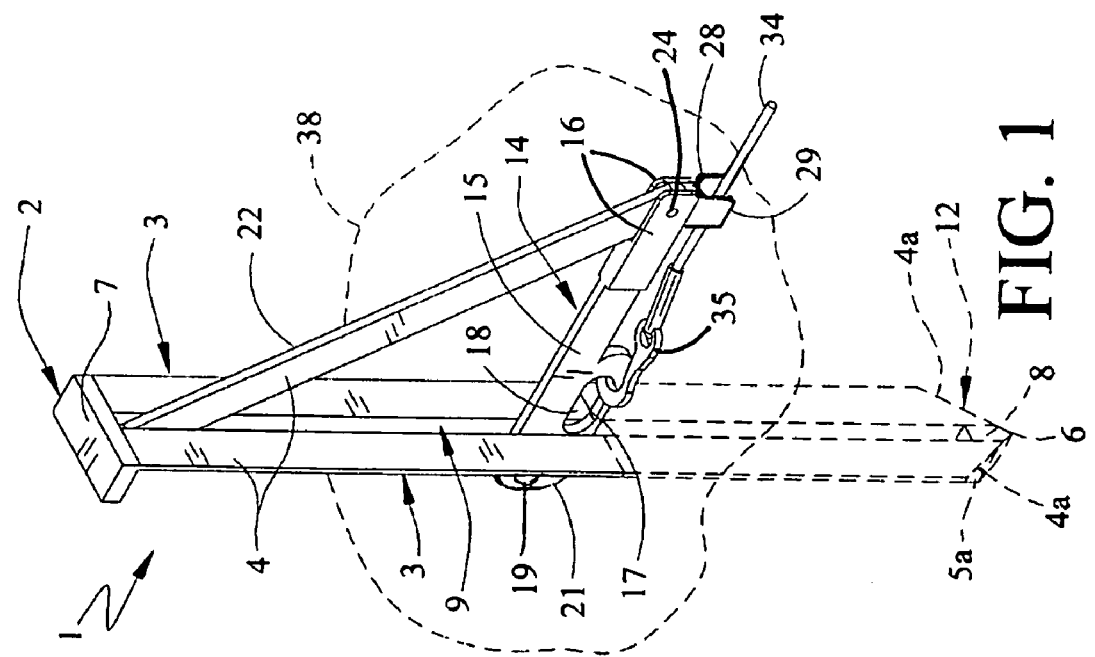
FIG. 2 is a side view of the ground anchor, inserted in the ground and deployed in an extended, functional configuration with the winch cable (partially in section) attached to the ground anchor.

Each stake segment 3 of the anchor stake 2 may have a main plate 4 and a slot plate 5 which extends from the main plate 4 in generally perpendicular relationship to the main plate 4. The spaced-apart, adjacent slot plates 5 of the stake segments 3 extend the depth of the stake slot 9 beyond the plane of the main plates 4 of the respective stake segments 3. At the insertion end 12 of the anchor stake 2, the main plate 4 of each stake segment 3 has a main plate bevel 4a and the slot plate 5 of each stake segment 3 has a slot plate bevel 5a. The main plate bevels 4a of the respective main plates 4 and the slot plate bevels 5a of the respective slot plates 5 converge to define a stake tip 6 at the terminus of the insertion end 12. As illustrated in FIGS. 2 and 3, an arm stop plate 10, the purpose of which will be hereinafter described, may be welded and/or otherwise attached to the slot plates 5 of the stake segments 3, between the strike plate 7 and the insertion end 12.

An attachment arm 14 slidably engages the segment of the stake slot 9 which extends between the stake weld 8 and the arm stop plate 10 of the anchor stake 2. The attachment arm 14 may include, for example, an elongated attachment arm shaft 15 having a slot end segment 21 which extends through the stake slot 9. As illustrated in FIG. 5, an arm pin 19 extends through a pin opening 15a provided in the slot end segment 21 of the attachment arm 14. As illustrated in FIGS. 2 and 3, the arm pin 19 is typically welded or tightly fitted in the respective slot plates 5 of the stake segments 3 to prevent the slot end segment 21 on the attachment arm shaft 15 of the attachment arm 14 from slipping out of the stake slot 9. A cable loop 17, through which extends a loop opening 18, may be provided on the attachment arm shaft 15, typically generally adjacent to the slot end segment 21 of the attachment arm 14 for purposes which will be hereinafter described.

One end of an elongated stabilizing arm 22 is pivotally mounted in the stake slot 9, typically adjacent to the strike plate 7. The opposite end of the stabilizing arm 22 is pivotally attached to the end of the attachment arm 14 which is opposite the slot end segment 21. Accordingly, a pair of spaced-apart attachment arm flanges 16 may extend from the attachment arm shaft 15 of the attachment arm 14. As illustrated in FIG. 5, one end of the stabilizing arm 22 extends between the attachment arm flanges 16. A pivot pin 24 extends through aligned pin openings 16a provided in the respective attachment arm flanges 16 and through a registering pin opening 22a provided in the stabilizing arm 22. Accordingly, as further illustrated in FIG. 5, another pivot pin 23 extends through aligned pin openings (not illustrated) provided in the respective slot plates 5 of the stake segments 3 and through a registering pin opening 22b provided in the stabilizing arm 22 and is typically welded in place. Therefore, the attachment arm 14 and stabilizing arm 22 can be deployed between the extended, functional configuration illustrated in FIGS. 1-3, in which functional configuration the attachment arm 14 and stabilizing arm 22 extend from the stake slot 9; and the folded, non-functional configuration illustrated in FIG. 4, in which non-functional configuration the attachment arm 14 and stabilizing arm 22 extend within the stake slot 9. In the extended, functional configuration of the ground anchor 1 illustrated in FIGS. 1-3, the stabilizing arm 22 is deployed at a generally acute angle with respect to the longitudinal axis of the anchor stake 2. The attachment arm 14 is deployed in generally perpendicular relationship with respect to the longitudinal axis of the anchor stake 2 and at a generally acute angle with respect to the longitudinal axis of the stabilizing arm 22, generally imparting a "FIG. 4" shape to the ground anchor 1. In the folded, non-functional configuration of the ground anchor 1 illustrated in FIG. 4, the attachment arm 14 and stabilizing arm 22 extend along the longitudinal axis of the anchor stake 2 and within the stake slot 9, with the stabilizing arm 22 suspended from the anchor stake 2 and the attachment arm 14 suspended from the stabilizing arm 22 when the anchor stake 2 is disposed in a generally vertical orientation.

In typical use of the ground anchor 1, which will be hereinafter further described, a winch cable 34 (shown partially in section in FIGS. 1 and 2) which is extended from a winch (not illustrated) provided on an ATV (not illustrated) or other vehicle immobilized in mud or other soil is adapted for attachment to the ground anchor 1. Accordingly, a cable hook 35 may be provided on the winch cable 34 for attachment to the cable loop 17 on the attachment arm shaft 15 of the attachment arm 14. A cable plate 28, typically fitted with a pair of spaced-apart cable flanges 29, may be provided on the attachment arm 14, in spaced-apart relationship to the cable loop 17. As illustrated in FIGS. 1 and 2, the winch cable 34 can be inserted between the cable flanges 29, which stabilizes the winch cable 34 in generally parallel relationship with respect to the longitudinal axis of the attachment arm shaft 15 of the attachment arm 14. This enables the winch cable 34 to transmit resistance in a straight line between the ground anchor 1 and the winch during extrication of the ATV from the mud or other soil.

Referring next to FIGS. 1-4 of the drawings, in typical use, the ground anchor 1 is carried on a vehicle such as an ATV (not illustrated), for example, typically while the ground anchor 1 is deployed in the folded, storage or non-functional configuration illustrated in FIG. 4 to facilitate space-efficient storage of the ground anchor 1 on the ATV. Accordingly, the attachment arm 14 and the stabilizing arm 22 extend inside and along the stake slot 9 of the anchor stake 2, generally parallel to the longitudinal axis of the anchor stake 2. The ATV is typically fitted with a winch (not illustrated) which may be conventional and typically includes a rotating, manually-operated or motor-operated winch drum that is mounted on a winch frame or bracket attached to the frame of the ATV. The winch cable 34 (FIGS. 1 and 2), typically fitted with the winch hook 35, is normally maintained in a wound configuration on the winch drum of the winch. In the event that the ATV inadvertently becomes immobilized in mud or other loose soil or terrain (not illustrated) in a wooded area, for example, conventional practice may be followed in which case the winch cable 34 of the winch is extended from the winch spool and fastened around a tree (not illustrated) or other support which is within reach of the winch cable 34 to anchor the winch.

Under some circumstances, however, the ATV is immobilized in a location which is too remote with respect to a tree or other suitable support to which the winch cable 34 could otherwise be attached because the tree or other support is beyond the reach of the winch cable 34. In that case, the ground anchor 1 is removed from the immobilized ATV, placed at a distance from the ATV which is within the reach of the winch cable 34 and inserted in the ground 38, as illustrated in FIGS. 1 and 2. The anchor stake 2 of the ground anchor 1 may be inserted in the ground 38 by, for example, initially resting the stake tip 6 at the insertion end 12 of the anchor stake 2 on the surface of the ground 38, with the anchor stake 2 disposed in a generally vertical orientation and the stabilizing arm 22 and attachment arm 14 suspended within the stake slot 9, and then incrementally driving the anchor stake 2 into the ground 38 by repeatedly striking the strike plate 7 with a sledgehammer (not illustrated), for example. As this driving action is repeated and the anchor stake 2 incrementally descends into the ground 38, the slot end segment 21 of the attachment arm 14, initially suspended in and protruding from the stake slot 9, as illustrated in FIG. 4, approaches and eventually rests on the ground 38. After that point, the attachment arm 14 is stationary on the ground 38 and incrementally traverses the stake slot 9 as the stop plate 10 initially descends with the anchor stake 2 toward the ground 38 and approaches and eventually contacts the attachment arm 14.

As the stationary slot end segment 21 of the attachment arm 14 traverses the stake slot 9 of the descending anchor stake 2, the attachment flange 16 end of the attachment arm 14 incrementally extends away from the stake slot 9. Simultaneously, the stabilizing arm 22 is incrementally extended from the stake slot 9 as it pivots with respect to the attachment arm 14 at the pivot pin 24 and with respect to the anchor stake 2 at the pivot pin 23. When the anchor stake 2 is fully inserted in the ground 38, as illustrated in FIGS. 1 and 2, the arm stop plate 10 contacts the portion of the slot end segment 21 of the attachment arm 14 which extends from the stake slot 9. The longitudinal axis of the attachment arm 14 is disposed in generally perpendicular relationship with respect to the longitudinal axis of the anchor stake 2 and the attachment arm 14 is oriented in a generally horizontal position between the ground 38 and the arm stop plate 10, as illustrated in FIG. 2. The stabilizing arm 22 extends in an angled orientation between the anchor stake 2 and the attachment flange 16 end of the attachment arm 14, generally imparting a "FIG. 4" shape to the ground anchor 1.

Next, the winch cable 34 is unwound from the winch drum (not illustrated) of the winch and extended to the ground anchor 1. The cable hook 35 of the winch cable 34 is attached to the cable loop 17 on the attachment arm 14, with the winch cable 34 typically extending generally beneath and parallel to the attachment arm 14, between the cable flanges 29. The winch is then operated typically in conventional fashion to pull the ATV against resistance which is imparted by the ground anchor 1 in an axial direction along the winch cable 34 and extricate the ATV from the soil as the winch cable 34 is wound on the winch drum. As tension is applied to the attachment arm 14 along the axis of the winch cable 34, the attachment arm 14 engages the ground 38, and the winch cable 34, which enhances resistance of the ground anchor 1 to the pulling action of the winch. The arm pins 19 are seated in the slot plates 5 of the respective stake segments 3, and therefore, prevent the slot end segment 21 of the attachment arm 14 from digging into the ground 38 and inadvertently sliding through the stake slot 9 during operation of the winch.

After extrication of the ATV, the cable hook 35 is detached from the cable loop 17 and the winch cable 34 is typically rewound on the winch drum. The ground anchor 1 can be pulled from the ground 38 using any suitable technique, such as, for example, by operation of the ATV or other vehicle; digging into the ground 38 around the ground anchor 1 to facilitate loosening and pulling of the ground anchor 1 from the ground 38; or repeatedly working the ground anchor 1 in a back-and-forth motion in the ground 38 to facilitate loosening and pulling of the ground anchor 1 from the ground 38.

While the preferred embodiments of the invention have been described above, it will be recognized and understood that various modifications can be made in the invention and the appended claims are intended to cover all such modifications which may fall within the spirit and scope of the invention.

Having described my invention with the particularity set forth above, I claim:

1. A ground anchor comprising:
    a generally elongated anchor stake for receiving a winch cable, said anchor stake having a pair of elongated, spaced-apart stake segments;
    a stake slot provided between said stake segments of said anchor stake;
    an elongated stabilizing arm having a first end pivotally carried by said anchor stake in said stake slot and a second end extendable from said stake slot; and
    an attachment arm pivotally carried by said second end of said stabilizing arm and slidably extending through said stake slot, said attachment arm slidable along at least a portion of the length of said stake slot and a cable loop having a cable loop opening provided in said attachment arm between said second end of said stabilizing arm and said anchor stake for receiving the winch cable, wherein said stabilizing arm and said attachment arm are extendable from said stake slot in functional anchoring configuration and said stabilizing arm and said attachment arm are foldable and at least partially recessed in said stake slot in a stored configuration responsive to said attachment arm slidable along at said at least a portion of the length of said stake slot.

2. The ground anchor of claim 1 further comprising an arm stop plate carried by said anchor stake between said first end of said stabilizing arm and said attachment arm for limiting the travel of said attachment arm in said stake slot.

3. The ground anchor of claim 1 wherein said attachment arm comprises a generally elongated attachment arm shaft having a slot end segment slidably extending through said stake slot and a pair of attachment flanges carried by said attachment arm shaft in spaced-apart relationship to said slot end segment, and wherein said second end of said stabilizing arm is pivotally mounted between said pair of attachment flanges.

4. The ground anchor of claim 3 further comprising an arm bolt carried by said slot end segment of said attachment arm and normally engaging said anchor stake.

5. The ground anchor of claim 1 further comprising spaced-apart cable flanges provided on said attachment arm for receiving the winch cable and wherein said cable loop is carried by said attachment arm substantially in alignment with said cable flanges.

6. The ground anchor of claim 5 further comprising a cable plate having at least one cable flange carried by said attachment arm in spaced-apart relationship to said cable loop.

7. The ground anchor of claim 1 further comprising a strike plate carried by said anchor stake at a first end of said stake slot.

8. The ground anchor of claim 7 wherein said anchor stake comprises a generally tapered insertion end having a stake tip at a second end of said stake slot.

9. A ground anchor for anchoring one end of a winch cable comprising:
    a generally elongated anchor stake including a pair of elongated, spaced-apart stake segments having a pair of main plates, respectively, and a pair of slot plates disposed in generally perpendicular relationship with respect to said pair of main plates, respectively;
    a stake slot provided between said pair of main plates and said pair of slot plates of said stake segments, respectively, of said anchor stake;
    an elongated stabilizing arm having a first end pivotally carried by said anchor stake in said stake slot and a second end extendable from said stake slot;
    an attachment arm having one end pivotally carried by said second end of said stabilizing arm and the opposite end of said attachment arm slidably restrained in said stake slot and said attachment arm slidable along at least a portion of the length of said stake slot in spaced-apart relationship to said first end of said stabilizing arm; a cable loop opening provided in said attachment arm between said stake slot and said second end of said stabilizing arm for receiving said one end of the winch cable; and a pair of cable flanges provided on said attachment arm for receiving and guiding the winch cable; and
    an arm stop plate carried by said anchor stake between said first end of said stabilizing arm and said attachment arm, wherein said stabilizing arm and said attachment arm are slidably insertable at least partially in said stake slot in folded configuration, with said opposite end of said attachment arm spaced-apart from said arm stop plate, and said stabilizing arm and said attachment arm are extendible from said stake slot, with said opposite end of said attachment arm contacting said arm stop plate in operating configuration.

10. The ground anchor of claim 9 further comprising a strike plate carried by said anchor stake at a first end of said stake slot.

11. The ground anchor of claim 10 wherein said anchor stake comprises a generally tapered insertion end having stake tip at a second end of said stake slot.

12. The ground anchor of claim 11 wherein said insertion end comprises a pair of main plate bevels provided on said pair of main plates, respectively, and a pair of slot plate bevels provided on said pair of slot plates, respectively, and converging to said stake tip.

* * * * *